United States Patent [19]

Meitzler et al.

[11] Patent Number: 4,645,975
[45] Date of Patent: Feb. 24, 1987

[54] COMPOSITE LIGHT PICKUP DEVICE

[75] Inventors: Allen H. Meitzler, Ann Arbor; George S. Saloka, Canton, both of Mich.

[73] Assignee: Ford Motor Company, Dearborn, Mich.

[21] Appl. No.: 647,331

[22] Filed: Sep. 4, 1984

[51] Int. Cl.[4] .................................. B60Q 1/02
[52] U.S. Cl. ........................... 315/82; 315/83; 315/155; 250/214 AL
[58] Field of Search ............... 315/82, 83, 153, 155, 315/159; 250/214 AL, 227; 307/10 LS

[56] References Cited

U.S. PATENT DOCUMENTS

| | | | |
|---|---|---|---|
| 2,944,188 | 7/1960 | Lohr et al. | 315/83 |
| 3,249,761 | 5/1966 | Baumanns | 315/82 X |
| 3,775,639 | 11/1973 | Woodward | 315/83 |
| 3,909,661 | 9/1975 | Grossenbacher | 315/82 |
| 3,974,472 | 8/1976 | Gould, Jr. | 340/337 |
| 4,105,928 | 8/1978 | Leconte | 315/82 |
| 4,122,357 | 10/1978 | Sumida | 307/10 R |
| 4,236,099 | 11/1980 | Rosenblum | 315/83 |
| 4,368,406 | 1/1983 | Kruzich et al. | 315/158 |
| 4,376,909 | 3/1983 | Tagami et al. | 315/82 |
| 4,427,881 | 1/1984 | Ruell | 250/227 |
| 4,539,474 | 9/1985 | Takahata | 250/227 X |

FOREIGN PATENT DOCUMENTS 0055227  6/1982  European Pat. Off. ............. 315/82

OTHER PUBLICATIONS

Ford's 1984 Car Shop Manual, pp. 32-12-1 through 32-15-5.
Ford's 1984 Car Wiring & Vacuum Diagrams, p. E4A-900-6.

Primary Examiner—Saxfield Chatmon
Attorney, Agent, or Firm—Paul K. Godwin, Jr.; Clifford L. Sadler

[57] ABSTRACT

A composite light pickup device for use in an automotive vehicle to collect light from both the ambient surroundings and from oncoming vehicles and employing separate optical fiber couplings of the collected light to a headlamp system that responsively activates the vehicle headlamps when the ambient light level is too low and switches the activated headlamps between high and low beams in response to receiving light from oncoming vehicle headlamps.

4 Claims, 3 Drawing Figures

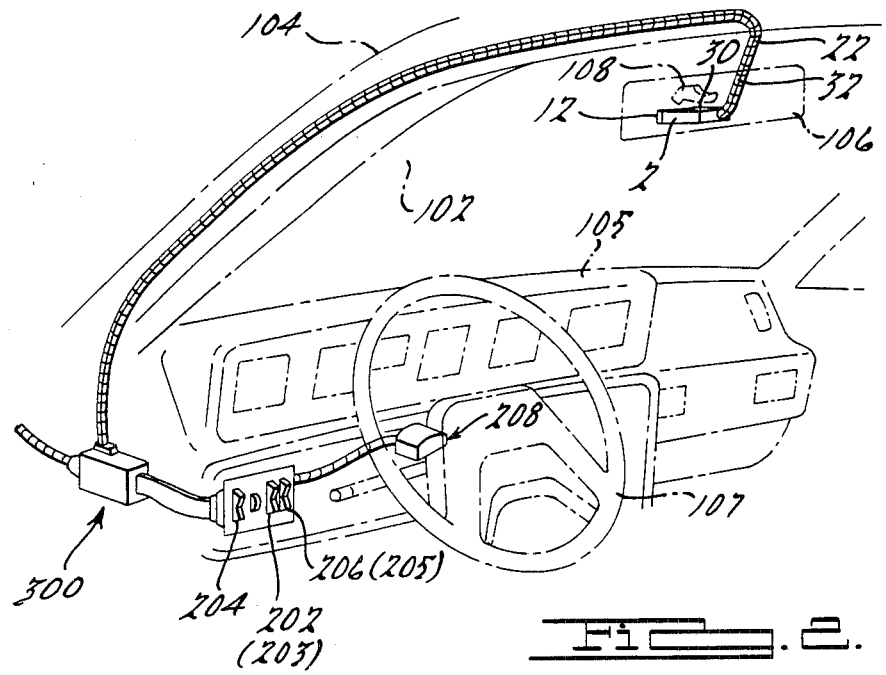
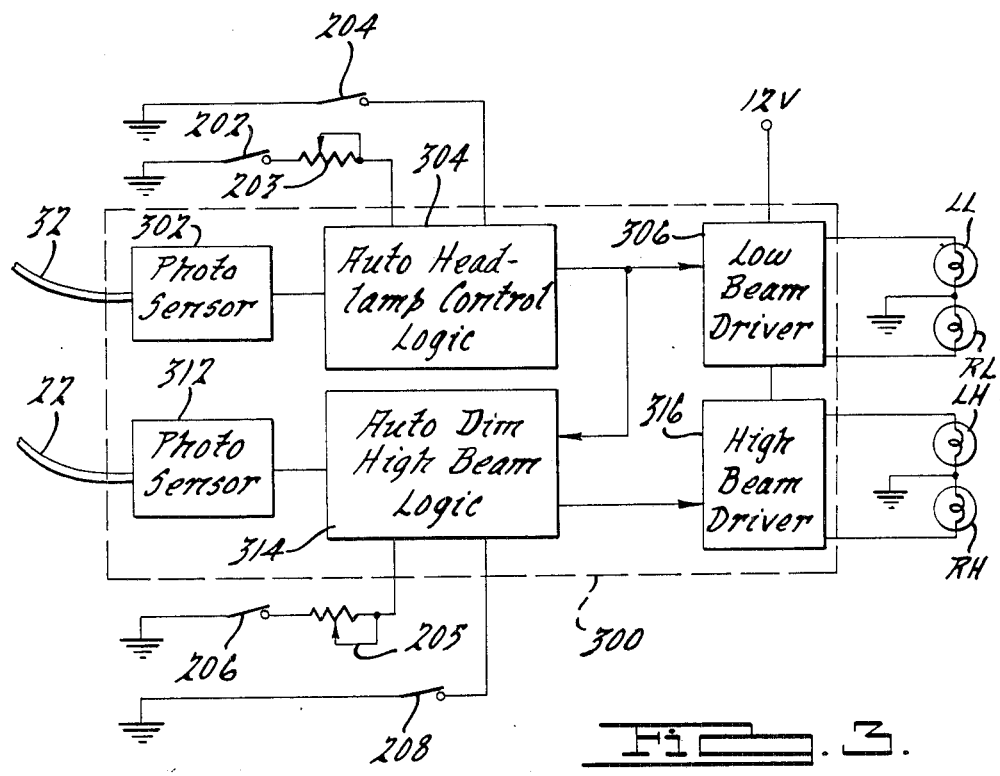

COMPOSITE LIGHT PICKUP DEVICE

BACKGROUND OF THE INVENTION

1. Field of the Invention

The present invention is directed to the field of light sensing and responsive control systems and more specifically to the area of light collectors for use in an automatic headlamp switching system for an automotive vehicle.

2. Description of the Prior Art

U.S. Pat. Nos. 4,376,909 and 3,775,639 illustrate respective systems for automatically turning on automotive headlamps in response to a drop in ambient brightness and for automatically switching energized headlamps between high and low beam headlamps in response to oncoming vehicle lights. In each of the aforementioned patents, a light sensitive element is described as being mounted to directly receive the particular light for which the system is to respond.

In a typical implementation of an automatic headlamp-on system, an ambient light sensor module is mounted onto the dashboard of a vehicle so as to receive ambient light entering the windshield. The ambient light sensor module normally includes an exposed photocell along with its own preamplifier in order to provide a corresponding electrical output signal at a high enough level to be conducted to a remotely located control circuit. An associated wiring harness is necessary to interconnect the sensor module to the control circuit and normally one or more removable connectors are included at either end of the harness in the event subsequent repair service necessitates removal of the sensor module.

In a typical installation of the automatic dimming feature, wherein energized headlamps are switched from their high beam to the low beam illumination in response to oncoming vehicle headlamps, an automatic dimmer module is mounted beneath the windshield of a vehicle at the base of a rearview mirror mount. The module contains a lens which has a relatively low angle of vertical acceptance and is directed towards the front of the vehicle. A photocell and preamplifier are included within the automatic dimmer module; and an appropriate wiring harness with connectors provides interconnection of the sensor preamplifier to its associated control circuit.

In each of the described prior art devices, the fabrication of separate light sensor modules as well as the fabrication of wiring harnesses and installation contribute significant cost penalties to the systems and increase the potential for failure and subsequent service.

SUMMARY OF THE INVENTION

The present invention is intended to overcome the disadvantages of the prior art by providing a composite light pickup device in a single unit which monitors both oncoming headlamp lights and ambient light conditions. The present invention is passive in nature in that it does not include any electrical components or connections between its mounting position in an associated vehicle and the remotely located automatic control circuitry. Such elimination of wiring and electrical components is achieved by the use of fiber optic couplings between the light collecting elements of the device and the transfer of that coupled light to photocells remotely located in the control circuitry.

The composite light pickup device of the present invention includes a lens element having its optical axis oriented along a predetermined direction towards the front of a vehicle to receive oncoming headlamp illumination The lens element is separated from a corresponding fiber optic termination located at the focal point of the lens so as to receive any light gathered by the lens element. The device also includes a light collecting element having at least one transparent planar surface, oriented so as to receive ambient light from above the vehicle, and a corresponding fiber optic termination within the light collecting element. In the vehicle environment, the lens element and its corresponding fiber optic termination are located below the ambient light collecting element so that both elements can be mounted adjacent the windshield to receive light from both the forward direction and the ambient.

BRIEF DESCRIPTION OF THE DRAWINGS

FIG. 2 is a schematic illustration of the present invention within a vehicular environment.

FIG. 3 is a block diagram of the electrical control system associated with the present invention.

DETAILED DESCRIPTION OF THE PREFERRED EMBODIMENT

Figure 1:
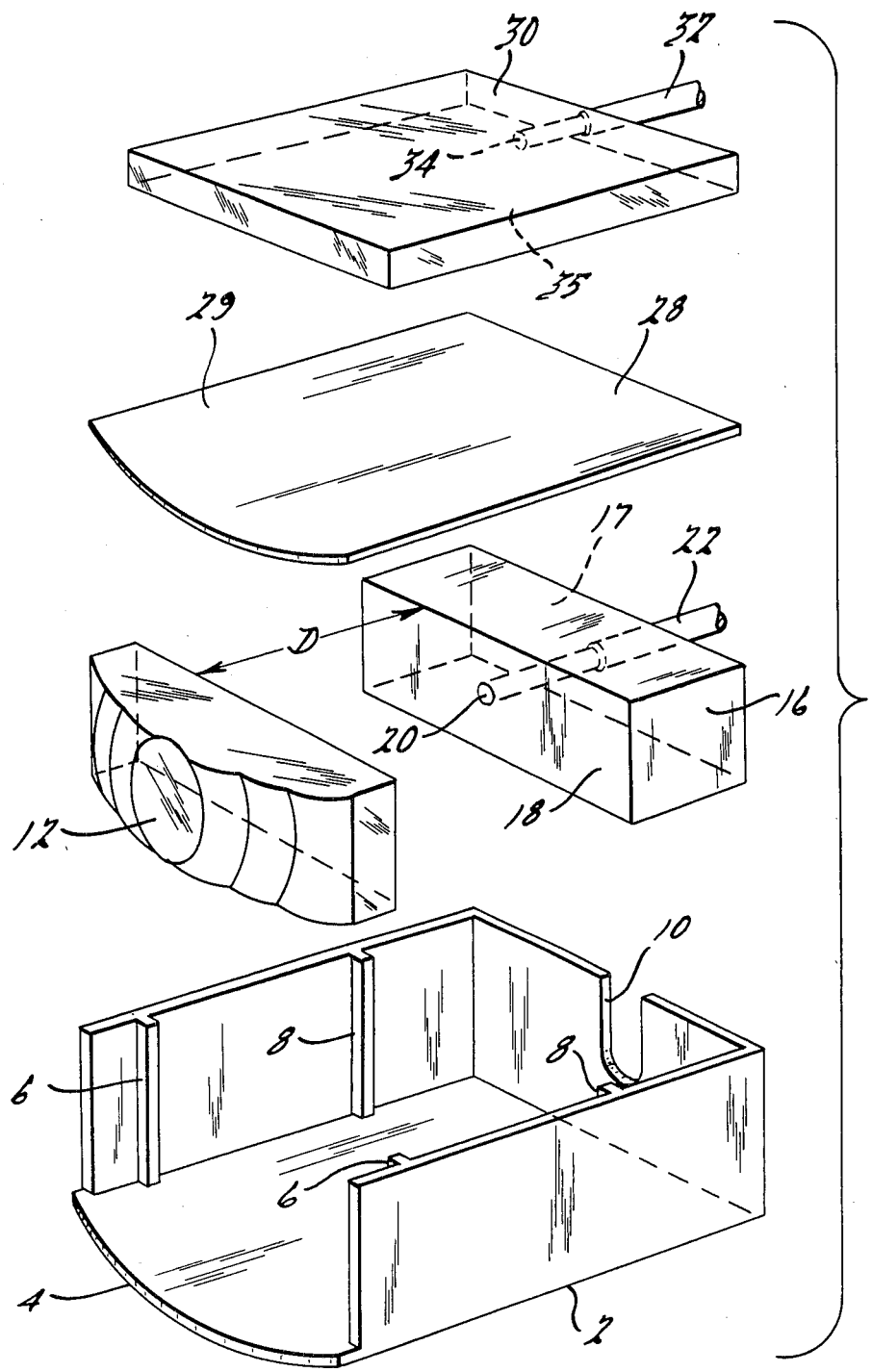
FIG. 1 is an exploded view of the components which are employed in a preferred embodiment of the present invention.

The composite light pickup device of the present invention is shown in an exploded view of FIG. 1 as including a housing 2, an oncoming headlamp lens 12, an optical fiber retaining block 16, and an ambient light collecting element 30. The housing 2 is shown as containing three opaque sides, an opaque bottom and an open front for accepting the lens 12. The lens 12 is fitted to the front of the housing 2 so that it rests against the bottom 4 and side support ribs 6. The housing 2 is constructed of an opaque plastic material so that light entering the housing is only that which enters through the lens 12. An optical fiber 22 is inserted within the coupling block 16 so that its cleaved end termination 20 is exposed at the surface 18 of the coupling block 16. The optical fibers are commercially available plastic fibers with core and cladding of transparent plastic and an outer jacket of opaque plastic. The core diameter is approximately 1 mm. The coupling block 16 is mounted within the housing 2 so as to be behind the support ribs 8 and retained in place a distance "D" across an air space from the lens 12. The distance "D" is determined by the focal length of the lens 12; and the cleaved end 20 of the optical fiber 22 is located at the focal point of that lens so as to couple the focused light into the optical fiber 22. The back of the housing 2 includes a U shaped aperture to allow assembly of coupling block 16 therein by providing clearance for the optical fiber 22. An opaque cover 29 is placed over the lens element 12 and the coupling block 16 so as to provide an additional shield that prevents the entry of stray light that may be coupled into the optical fiber 22.

The ambient light collector element 30 is formed as a plastic sheet having upper and lower parallel surfaces. At least the upper surface of the collector element 30 is transparent so as to receive impinging incident light occuring within a relatively wide solid angle. The ambient light collector element 30 is preferably formed of an acrylic material containing a phosphorescent dye so that ambient light received thereby excites internal phosphorescence between the surfaces of the element. An optical fiber 32 may be either molded within the element 30 or inserted into a close tolerance socket so that its cleaved end 34 couples the light present within the element. Added sensitivity may be achieved by including a reflective coating to underside surface 35 of the element 30 or providing such a reflective coating 28 to the upper surface of the opaque cover 29.

FIG. 2 illustrates the schematic representation of the vehicle interior environment in which the composite light pickup device of the present invention is intended to be installed. A vehicle 104 is shown, which contains a windshield 102 onto which a rearview mirror 106 is attached through a bracket 108. The device shown in FIG. 1 is installed on the bracket 108 so that the lens element 12 is directed forward of the vehicle to pick up light radiated from oncoming vehicle headlamps over a relatively narrow vertical angle and the ambient light element 30 is oriented in an upward direction to pick up the ambient light over a relatively wide solid angle. The optical fibers 22 and 32 are routed through the interior channels of the vehicle to a control circuit 300 mounted beneath the instrument panel 105. A plurality of vehicle operator controlled switches are included for access on the lower portion of the instrument panel 105 and adjacent the steering wheel 107. Those switches include a conventional headlamp switch 204, an automatic headlamp on/off switch 202 with its delay adjustment 203, an automatic high beam dimming switch 206 with its delay adjustment 205, and a manually actuated high beam switch 208.

FIG. 3 illustrates a block diagram of a control circuit which may be used in conjunction with the present invention to provide both automatic headlamp-on control and automatic dimming of the high beam headlamps. In that circuit, the optical fiber 32 from the ambient light sensor element 30 is fed to a photo sensor 302. When the ambient light level drops a sufficient amount, the automatic headlamp control logic circuit 304 senses the output of the photo sensor 302. Depending upon the position of the automatic headlamp on/off switch 202, the logic circuit 304 will cause illumination of the left low beam headlamp and the right low beam headlamp, through corresponding low beam driver circuit 306, as well as energization of the left high beam headlamp and the right high beam headlamp through high beam driver circuit 316. Of course, rear tail lamps, side marker lights and dashboard lights may also be activated.

In the event the automatic dimming switch 206 is closed, the automatic dimming high beam logic circuit 314 will control the automatic dimming of the high headlamp beams after they are energized. In operation, light of sufficient magnitude coupled through the optical fiber 22 to the photo sensor 312 indicating the reception of light from oncoming vehicle headlamps, will cause dimming of the high beams. Of course, manual override of either logic circuit is provided by the respective headlamp switch 204 and the high beam actuation switch 208.

The following Truth Table illustrates the various states in which the system functions to energize or de-energize the various low and high beam headlamps depending upon the various switch settings.

| TRUTH TABLE | | | | | | | | |
|---|---|---|---|---|---|---|---|---|
| State | 202 | 204 | 32 | 206 | 208 | 22 | Low Beams | High Beams |
| A | 1 | 1 | — | 1 | 1 | — | OFF | OFF |
| B | — | 0 | — | 1 | 1 | — | ON | OFF |
| C | 1 | 1 | — | — | 0 | — | OFF | ON |
| D | 0 | 1 | 1 | 1 | 1 | — | OFF | OFF |
| E | 0 | — | 0 | 1 | 1 | — | ON | OFF |
| F | 0 | — | 0 | 0 | 1 | 1 | ON | OFF |
| G | 0 | — | 0 | 0 | 1 | 0 | ON | ON |
| H | 0 | — | 0 | — | 0 | — | ON | ON |
| I | — | 0 | — | — | 0 | — | ON | ON |

"0" = Closed switch = no light sensed
"1" = Opened switch = light sensed
"—" = Not determinative It will be apparent that many modifications and variations may be implemented without parting from the scope of the novel concept of this invention. Therefore, it is intended by the appended claims to cover all such modifications and variations which fall within the true spirit and scope of the invention.

We claim:
1. A passive composite light pickup device for use in a headlamp control system of an automotive vehicle including:
   a first lens element means oriented to collect light directed from a narrowly defined range of angles towards the front of the vehicle;
   a second means formed of a light transparent material containing a light activated phosphor dye and having at least one transparent surface attached to said first means and disposed for collecting ambient light directed from a fairly wide range of angles from above the vehicle;
   a pair of fiber optic transmission line respectively associated with said first and second means for coupling a portion of the light collected from said first and second means to respective light sensors within said system, remote from said composite pickup device.

2. A composite light pickup device as in claim 1, wherein said device is mounted beneath the uppermost portion of the windshield of said vehicle so as to receive light entering said vehicle from said defined directions.

3. A composite light pickup device as in claim 1, wherein said optical fiber connected to said second means has a first end surface that is normal to said collecting transparent surface.

4. A composite light pickup device as in claim 1, wherein said optical fiber connected to said first means has a first end surface that is positioned at the focal point of said lens element.

* * * * *